Figure 1:
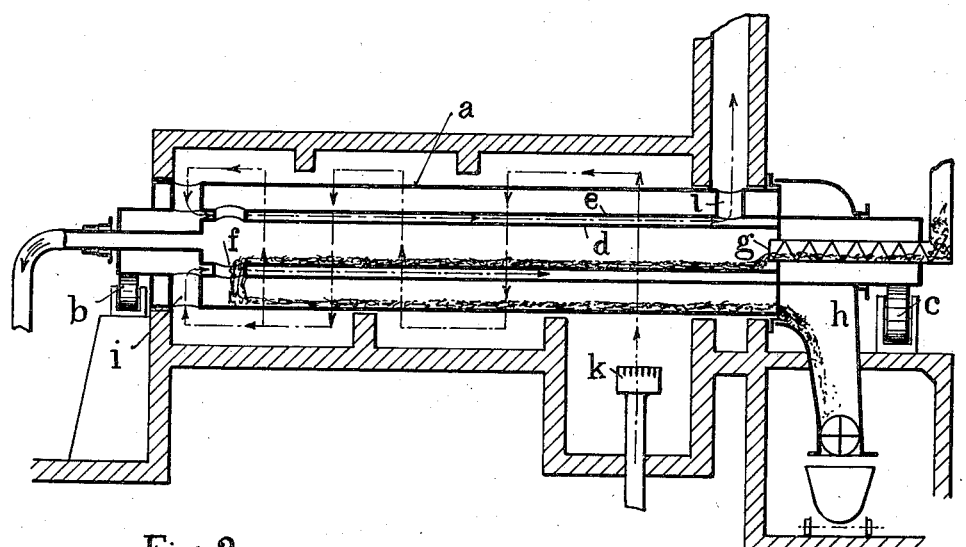

Sept. 16, 1924.

A. RÜHR 1,508,578

APPARATUS FOR THE DISTILLATION OF COAL AND OTHER SUBSTANCES

Filed Oct. 9, 1923

Inventor:

Patented Sept. 16, 1924.

1,508,578

UNITED STATES PATENT OFFICE.

ARNOLD RÜHR, OF NUREMBERG, GERMANY, ASSIGNOR TO KOHLENSCHEIDUNGS-GESELLSCHAFT M. B. H., OF BERLIN, GERMANY, A CORPORATION OF GERMANY.

APPARATUS FOR THE DISTILLATION OF COAL AND OTHER SUBSTANCES.

Application filed October 9, 1923. Serial No. 667,460.

*To all whom it may concern:*

Be it known that I, ARNOLD RÜHR, a citizen of Germany, residing at Nuremberg, Bavaria, Germany, have invented certain new and useful Improvements in Apparatus for the Distillation of Coal and Other Substances, of which the following is a specification.

In recent times rotary drums have been greatly favoured in apparatus for the distillation of coal and other bituminous materials at moderate temperatures, and more particularly those having a so-called inner charge tube through which the material first passes for the purpose of preliminary treatment or preliminary heating after which it passes through the outer drum for the incomplete combustion proper. As a rule, the heat is supplied by the outer drum being heated by means of a flame or the like, whilst the inner drum and the material contained therein are heated by radiation and transference of heat from the outer drum and by the passage of the products of distillation over the material to be preliminarily treated. It is mainly the latter process that gives a great output.

However, in many cases it is not desirable to bring the freshly introduced material into contact with the discharged high grade hydrocarbons, as thereby precipitation of the latter through condensation in the material which is still cool is likely to occur and, moreover, the latter is also changed by the precipitates that are or may be formed. Moreover it may happen that the supply of heat to the inner drum and to the material contained therein is insufficient when there is no flow of vapours and gases. This heating is all the more insufficient because the transfer of heat by radiation is small, owing to the comparatively low temperature of the outer drum, and because the velocity of the gases and vapours flowing in the space between the outer and inner drums, which gases and vapours could effect a transfer of heat by conduction, is small, i. e. their heat transfer coefficients are unfavourable.

According to my invention, I effect a sufficient heating of the inner drum by making it double-walled and causing the flue gases of the firing of the outer drum to pass through the annular chamber formed between the two walls of the said inner drum. All the flue gases may be used for this purpose, or, alternatively, the main portion thereof may pass in a known manner into the flue or into a re-heating device for the purpose of continuous circulation, whilst the remainder is caused to pass through the jacket of the inner drum. Also the remainder just referred to may be utilized again in a known manner by providing endless circulating devices etc. The removal of the products of incomplete combustion may take place together with that of the gases and vapours driven out of the fresh material contained in the inner drum, but separate suction may be used as has already repeatedly been proposed.

Figure 2:
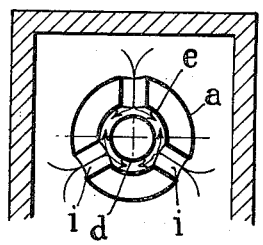

One mode of construction according to my invention is illustrated, by way of example, in the accompanying drawing, Fig. 1 being a central longitudinal section, and Fig. 2 a transverse section. The drum *a* for the incomplete combustion, which is rotated in well-known manner on the rollers *b* and *c*, is provided with an inner charge drum *d*. The wall of the latter drum is made double along the greater part of its length, a sleeve *e* being arranged to surround it suitably spaced therefrom. The material that enters the charge drum at *g* passes after the preliminary treatment into the outer drum *a* through openings *f* provided in the charge drum and leaves the outer drum at *h*. *i* are openings through which the flue gases of the burner *k* of the drum can enter into the chamber formed by the inner drum *d* and its sleeve *e*. The flue gases traverse this heating chamber and leave the same through similar openings *l* in order to pass to the chimney or in order to be utilized elsewhere. The products of the incomplete combustion (hydrocarbons, vapours and gases) leave the drum at *m*.

It will be seen that the arrangement of the heating sleeve *e* around the charge drum has the further advantage that also the material in the outer drum is heated more strongly and that heat is supplied thereto both from below and from above. For this reason, the output of a drum, according to the present invention, will be greater than that obtained with rotary drums as hitherto proposed, and for equal output the dimensions of my improved apparatus will be smaller.

What I claim is:—

1. Apparatus for the distillation of coal and the like, comprising a rotary drum closed at one end and open at the other, means for heating said drum externally, a double-walled tube carried concentrically within said drum, and means to feed the material to be treated into one end of said tube, the other end of said tube having openings for the passage of the material into the said drum, the space between the walls of the said tube serving as a passage for the gases of combustion from said heating means, the said drum having inlet and outlet openings communicating with the said space for the gases of combustion.

2. Apparatus for the distillation of coal and the like, comprising a rotary drum closed at one end and open at the other, means for heating said drum externally, a charge tube concentrically mounted within said drum, means to feed the material to be treated into the end of said tube adjacent to the open end of the said drum, the other end of the said tube being provided with openings for the passage of the material into the said drum, and a sleeve surrounding said tube so as to form a jacket around the same and having openings in it beyond the closed end of the said drum for admitting the gases of combustion from said heating means into said jacket, and an outlet opening for the escape of the said gases.

3. Apparatus for distilling coal and the like, comprising a casing provided with a source of heat and a chimney near one end, a drum rotatably mounted in said casing and communicating with a discharge outlet at its end adjacent said end of the casing, the other end of said drum being closed, a jacketed tube carried coaxially within said drum, and means to feed the material to be treated into the end of said tube adjacent said discharge outlet, the other end of said tube having openings for the passage of the material into the said drum, and the jacket wall of said tube having openings for the admission of the heating gases at its end beyond the closed end of the said drum and for the escape of said gases into said chimney at its end adjacent said discharge outlet.

In testimony whereof I affix my signature in presence of two witnesses.

ARNOLD RÜHR.

Witnesses:
   ALEXIS PHILIPPOFF,
   THEA J. KOETHE.